United States Patent
Lee et al.

(10) Patent No.: US 10,997,655 B1
(45) Date of Patent: *May 4, 2021

(54) VERIFYING A CUSTOMER ADDRESS BY DEVICE LOCATION PRIOR TO SENDING REPLACEMENT CARD

(71) Applicant: Wells Fargo Bank, N.A., San Francisco, CA (US)

(72) Inventors: Jesse F. Lee, Dublin, CA (US); Ish Kumar Malhotra, Moraga, CA (US); Steven E. Puffer, Champlin, MN (US); Katherine M. Yee, Orinda, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/442,931

(22) Filed: Jun. 17, 2019

Related U.S. Application Data (63) Continuation of application No. 15/389,576, filed on Dec. 23, 2016, now Pat. No. 10,430,874.

(51) Int. Cl.
   *G06Q 40/02* (2012.01)
   *H04W 4/021* (2018.01)
   *G06Q 10/08* (2012.01)

(52) U.S. Cl.
   CPC .......... *G06Q 40/02* (2013.01); *G06Q 10/083* (2013.01); *H04W 4/021* (2013.01)

(58) Field of Classification Search
   CPC ...... G06Q 10/083; G06Q 40/00; G06Q 40/02; H04W 4/021
   See application file for complete search history.

(56) References Cited

U.S. PATENT DOCUMENTS 5,838,237 A * 11/1998 Revell .................. G01S 1/68
                                                    340/573.1
6,836,765 B1    12/2004 Sussman
(Continued)

FOREIGN PATENT DOCUMENTS

CA    2710255         7/2009
CA    2732666 A1 *   2/2010  ............. H04L 41/00
(Continued)

OTHER PUBLICATIONS

Estes, Betsie: Geolocation—The Risk and Benefits of a Trending Technology, Sep. 26, 2016, ISACA Journal, Issue 2016, vol. 5, pp. 1-11. (Year: 2016).*

(Continued)

*Primary Examiner* — Bijendra K Shrestha
(74) *Attorney, Agent, or Firm* — Foley & Lardner LLP (57) ABSTRACT

Systems and methods relating to determining an address of a user by device location prior to sending a replacement card, the method being performed by a card management computing system associated with a card management entity. The method includes determining a location of a mobile device associated with a user via geolocation monitoring of the mobile device. The method further includes determining that a card associated with the user needs to be replaced. Upon determining that the card needs to be replaced, the method further includes determining an address for the user based on the geolocation monitoring. The method further includes sending instructions indicating a replacement card should be mailed to the determined address.

20 Claims, 3 Drawing Sheets

(56) References Cited

U.S. PATENT DOCUMENTS

| | | | |
|---|---|---|---|
| 8,624,725 B1* | 1/2014 | MacGregor | H04W 4/026 340/539.13 |
| 8,700,060 B2* | 4/2014 | Huang | G06F 16/9537 455/456.1 |
| 8,805,403 B2* | 8/2014 | Curticapean | G01S 5/0242 455/456.1 |
| 8,973,813 B2* | 3/2015 | Penny | G06Q 10/08 235/375 |
| 9,256,870 B1 | 2/2016 | Howe | |
| 9,291,700 B1* | 3/2016 | Rose | H04W 4/025 |
| 9,674,667 B2* | 6/2017 | Carlsson | H04W 4/021 |
| 10,482,415 B1* | 11/2019 | Dotterweich | G06Q 10/0833 |
| 2006/0084478 A1 | 4/2006 | Erlichmen | |
| 2008/0079581 A1* | 4/2008 | Price | G06Q 10/08 340/572.1 |
| 2009/0228384 A1* | 9/2009 | Melik-Aslanian | G06Q 20/342 705/35 |
| 2012/0047075 A1* | 2/2012 | Balistierri | G06Q 40/00 705/71 |
| 2012/0143722 A1 | 6/2012 | John | |
| 2013/0204947 A1* | 8/2013 | Guzman Suarez | G06F 16/90344 709/206 |
| 2013/0244609 A1* | 9/2013 | Velusamy | H04W 4/90 455/404.1 |
| 2014/0046830 A1 | 2/2014 | Orozco et al. | |
| 2014/0164280 A1* | 6/2014 | Stepanenko | G06F 40/174 705/341 |
| 2014/0171034 A1 | 6/2014 | Aleksin et al. | |
| 2014/0180959 A1 | 6/2014 | Gillen et al. | |
| 2014/0213214 A1* | 7/2014 | Reis | H04W 4/029 455/404.2 |
| 2014/0244461 A1* | 8/2014 | Shenoy | G06Q 20/354 705/35 |
| 2015/0020162 A1 | 1/2015 | Hefetz | |
| 2016/0269379 A1* | 9/2016 | Livesay | G06K 9/00288 |
| 2016/0314442 A1 | 10/2016 | Jiang et al. | |

FOREIGN PATENT DOCUMENTS

| | | | | |
|---|---|---|---|---|
| WO | WO-2010/067342 A1 | | 6/2010 | |
| WO | WO-2013151798 A1 | * | 10/2013 | ........ H04W 64/003 |

OTHER PUBLICATIONS

Rogak, Lisa: 4 things you must know about emergency credit card replacement, May 27, 2010, pp. 1-3 (Year: 2010).*

Estes, Betsie: Geolocation—The Risk and Benefits of a Trending Technology, 2016, ISACA Journal, Issue 2016, vol. 5, pp. 1-11 (Year: 2016).*

Johnson, Allie, "Replacing lost Credit card? Want it fast? Expect to pay", Jul. 6, 2016, pp. 1-11. (Year: 2016).

Visa: Card Acceptance Guidelines for Visa Merchants, 2015, pp. 1-79. (Year: 2015).

* cited by examiner

VERIFYING A CUSTOMER ADDRESS BY DEVICE LOCATION PRIOR TO SENDING REPLACEMENT CARD

CROSS-REFERENCE TO RELATED PATENT APPLICATIONS

This application is a continuation of U.S. patent application Ser. No. 15/389,576, filed on Dec. 23, 2016, which is incorporated by reference herein in its entirety.

BACKGROUND

As customer transition from receiving bills and statements in the mail to paying bills and receiving statement electronically, customers may update a physical address associated with an account less frequently or may forget to update the address. However, when the customer needs a new card or to replace a card, the card is sent to the address on file. If the customer has not updated the address on file after the customer has moved, the card will be sent to an address where the customer no longer resides. When the card is not sent to the correct address, the card may be returned to the company that sent the card, and the company has to contact the customer to obtain a new address for the customer and the has to be sent again. The process of having the card returned, reaching out to the customer for a correct address and resending the card causes time delays in the process and can be costly to the company. Therefore, verification of a customer address prior to sending a new or replacement card would be desirable.

SUMMARY

One embodiment of the invention relates to a method of determining an address for a user by device location prior to sending a replacement card, the method being performed by a card management computing system associated with a card management entity. The method includes determining a location of a mobile device associated with the user via geolocation monitoring of the mobile device. The method further includes determining that a card associated with the user needs to be replaced. Upon determining that the card needs to be replaced, the method further includes determining the address for the user based on the geolocation monitoring. The method further includes sending instructions indicating a replacement card should be sent to the determined address.

In some embodiments, the method further includes terminating geolocation monitoring after a predetermined amount of time. In some embodiments, determining the address for the user includes determining an address frequented by the mobile device of the user. In another embodiment, the address frequented by the mobile device of the user is determined by a location of the mobile device during a predetermined time period. In some embodiments, determining the address for the user further includes comparing the address frequented by the mobile device of the user to an address associated with an account associated with the user. In another embodiment, determining the address for the user further includes sending an alert to the user via the mobile device associated with the user when the address frequented by the mobile device of the user does not match the address associated with the account associated with the user. In some embodiments, the alert includes a request that the user verify the address for the replacement card to be sent. In another embodiment, the alert includes the address frequented by the mobile device of the user and the address associated with the account associated with the user. In some embodiments, determining the address for the user further includes receiving an indication from the mobile device of the user selecting the address for the replacement card to be sent.

Another embodiment relates to an apparatus for determining an address for a user by device location prior to sending a replacement card. The apparatus includes a card management circuit structured to determine when a card associated with the user needs to be replaced. The apparatus also includes a geolocation circuit structured to determine a location of a mobile device associated with a user via geolocation monitoring of the mobile device. The apparatus further includes a verification circuit structured to, upon determining that the card associated with the user needs to be replaced, determine an address for the user based on the geolocation monitoring. The apparatus also includes an account management circuit structured to send instructions indicating a replacement card should be sent to the determined address.

In some embodiments, the geolocation circuit is further structured to terminate geolocation monitoring after a predetermined amount of time. In another embodiment, the verification circuit is further structured to determine an address frequented by the mobile device of the user. In some embodiments, the address frequented by the mobile device of the user is determined by the location of the mobile device during a predetermined time period. In another embodiment, the verification circuit is further structured to compare the address frequented by the mobile device of the user to an address associated with an account associated with the user. In some embodiments, the apparatus further includes an alert circuit configured to send an alert to the user via the mobile device associated with the user when the address frequented by the mobile device of the user does not match the address associated with the account associated with the user. In another embodiment, the alert includes a request that the user confirm an address for the replacement card to be sent. In some embodiments, the alert include the address frequented by the mobile device of the user and the address associated with the account associated with the user. In another embodiment, the verification circuit is further structured to receive an indication from the mobile device of the user selecting the address for the replacement card to be sent.

Yet another embodiment relates to an address verification system. The system includes a network interface circuit structured to communicate data to and from devices via a network. The system further includes memory and one or more processors. The processors are structured to determine a location of a mobile device associated with a user via geolocation monitoring of the mobile device. The processors are further structured to determine that a card associated with the user needs to be replaced. The processors are further structured to, upon determining that the card needs to be replaced, determine an address for the user based on the geolocation monitoring. The processors are further structured to send instructions indicating a replacement card should be sent to the determined address.

In some embodiments, the processors are further configured to terminate geolocation monitoring after a predetermined amount of time. In another embodiment, the processors are configured to determine an address for the user by determining an address frequented by the mobile device of the user. In some embodiments, the address frequented by the mobile device of the user is determined by a location of the mobile device during a predetermined time period. In another embodiment, the processors are further configured to verify an address for the user by comparing the address frequented by the mobile device of the user to an address associated with an account associated with the user. In yet another embodiment, the processors are further configured to verify an address for the user by sending an alert to the user when the address frequented by the mobile device of the user does not match the address associated with the account associated with the user. In some embodiments, the alert includes a request that the user verify an address for the replacement card to be sent. In another embodiment, the alert includes the address frequented by the mobile device of the user and the address associated with the account associated with the user. In yet another embodiment, the processors are further configured to verify the address for the user by receiving an indication from the mobile device of the user verifying the address for the replacement card to be sent.

These and other features, together with the organization and manner of operation thereof, will become apparent from the following detailed description when taken in conjunction with the accompanying drawings.

DETAILED DESCRIPTION

Referring to the figures generally, systems and methods for verifying an address for a user prior to sending a replacement card are described. A card management computing system facilitates the verification of the address for the user. Identifying the address of the user is accomplished by initiating geolocation address verification on a mobile device of the user. Geolocation is used to monitor the location of the mobile device of the user during a designated period of time. The card management computing system identifies that a card associated with the user needs to be replaced. The geolocation monitoring is used to verify an address of the user by determining a most frequent address of the mobile device during the geolocation monitoring. The replacement card may be mailed to the address that was verified for the user.

Figure 1:
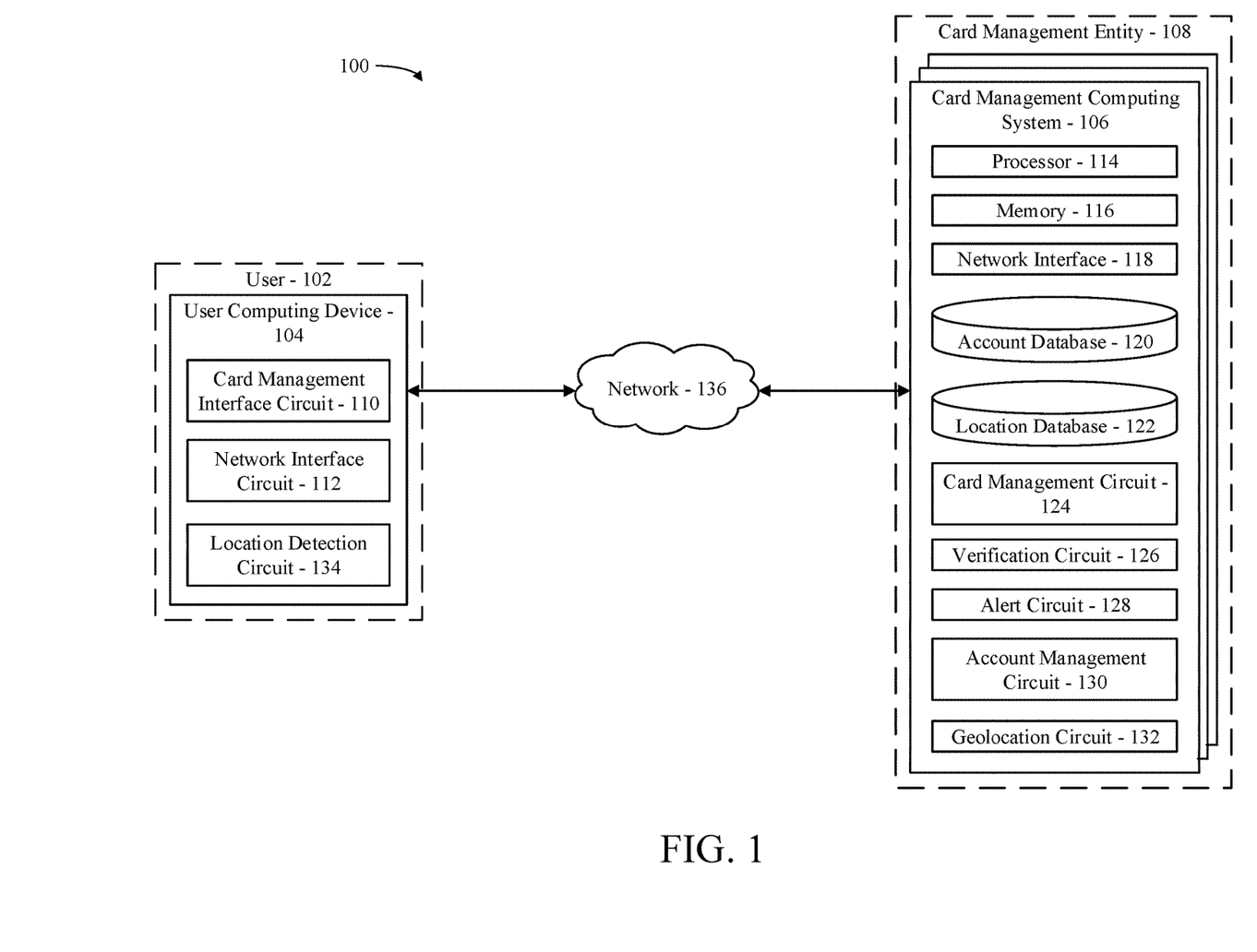
FIG. 1 is a diagram of a computing system, according to an example embodiment.

Referring to FIG. 1, a diagram of a computing system 100 is shown, according to an example embodiment. The computing system 100 includes a user computing device 104 associated with a user 102, a card management computing system 106 associated with a card management entity 108 and a network 136. Although shown as including a single user 102 and a single entity 108, multiple users 102 and entities 108 may be included in the system 100. Similarly, additional entities such as a card manufacturing entity, a financial institution and the like can exist in the system 100, or may be part of the card management entity 108. The components and the operation of the system 100 are described in further detail below.

The user 102 is associated with a user computing device 104. The user computing device 104 may be, but is not limited to, a phone (e.g., smartphone, etc.), a mobile computing device (e.g., tablet computer, laptop computer, person digital assistant, etc.), a desktop computing device, a wearable computing device, or the like. Wearable computing devices refer to any type of computing device that a user 102 wears including, but not limited to, a watch (e.g., a smart watch), glasses (e.g., eye glasses, sun glasses, smart glasses, etc.), a bracelet (e.g., a smart bracelet), etc.

The user computing device 104 includes a network interface circuit 112, a card management interface circuit 110 and a location detection circuit 134. The network interface circuit 112 is structured to facilitate data communication to and from other devices via the network 136. In some arrangements, data passing through the network interface circuit 112 is encrypted. The network interface circuit 112 may include any combination of wired network protocols (e.g., Ethernet, USB, Thunderbolt, etc.) and wireless network protocols (e.g., Wi-Fi, Bluetooth, CDMA, GSM, LTE, ZigBee, etc.). The card management interface circuit 110 is structured to allow the user device 104 to communicate data to and from the card management computing system 106 and other computing systems via the network interface circuit 112 and the network 136. For example, the card management interface circuit 110 may include a user interface that permits the user 102 to provide user information to the card management computing system 106 via the user device 104 (e.g., account information, card information, etc.). In some arrangements, the card management interface circuit 110 includes programming instructions stored in memory of the user device 104 that is executed locally on the user device 104 (e.g., as a smartphone application). In other arrangements, the card management interface circuit 110 includes a web-based interface application accessed via the network 136 (e.g., the Internet) on a web browser executed on the user device 104. In such arrangements, the card management interface circuit 110 is executed at least in part remotely and is maintained remotely (e.g., on the card management computing system 106). In this instance, the user 102 logs onto or accesses the web-based interface to access the card management interface circuit 110. In some arrangements, the card management interface circuit 110 is supported by a separate computing system comprising one or more servers, processors, network interface circuits, etc. that transmit the applications for use to the user computing device 104. In further arrangements, the card management interface circuit 110 includes an application programming interface (API) and/or a software development kit (SDK) that facilitate the integration of other applications (e.g., a mobile banking application, etc.) with the card management interface circuit 110. Through the card management interface circuit 110, the user 102 can accept/allow geolocation address verification, confirm a frequent address, receive alerts, and respond to alerts.

The location detection circuit 134 may be a GPS, an A-GPS, another circuit capable of determining a location of the user computing device 104, or a combination thereof. The location detection circuit 134 is communicably coupled to the network interface circuit 112 and the card management interface circuit 110. In some embodiments, the location detection circuit 134 stores location information with date and time information. In some embodiments, the location detection circuit 134 determines the location of the user computing device 104 and the card management interface circuit 110, the location database 122 or another circuit associates the location with a date and a time. In some embodiments, the location detection circuit 134 is continuously determining location data, and the location data is selectively sent to other circuits (e.g., card management interface circuit 110, location database 122, etc.) upon request. In some embodiments, the location detection circuit 134 determines location data when requested by the card management interface circuit 110 or another circuit.

The card management entity 108 includes the card management computing system 106. The card management entity 108 may be a financial institution (e.g., an issuer of credit cards), a card manufacturing company, a credit card network, or the like. The card management computing system 106 may be an independent card management provider or associated with another party. The card management computing system 106 provides card management services to a plurality of users, including the user 102. The card management computing system 106 maintains user information associated with the user 102, user account information associated with the user 102, and location information associated with the user computing device 104. In some arrangements, the card management computing system 106 maintains preference information set by the user 102.

The card management computing system 106 includes a processor 114, a memory 116, and a network interface circuit 118. The network interface circuit 118 is structured to facilitate data communication to and from other devices via the network 136. In some arrangements, data passing through the network interface circuit 118 is encrypted. The network interface circuit 118 may include any combination of wired network protocols (e.g., Ethernet, USB, Thunderbolt, etc.) and wireless network protocols (e.g., Wi-Fi, Bluetooth, CDMA, GSM, LTE, ZigBee, etc.). The processor 114 may be implemented as one or more general-purpose processors, application specific integrated circuits (ASICs), field programmable gate arrays (FPGAs), digital signal processors (DSPs), or other suitable electronic data processing components structured to execute instructions provided by memory 116.

The card management computing system 106 also includes an account management circuit 130 and an account database 120. The account database 120 stores user information relating to the user 102 and account information relating to one or more accounts (e.g., credit card account, checking account, etc.) held by user 102 at the card management entity 108 of an entity associated with the card management entity 108. The user information may include personal information such as a first name and a last name of the user 102, one or more email addresses associated with the user 102, one or more physical addresses associated with the user 102, one or more phone numbers associated with the user 102, user preferences, and the like. The account database 120 may store account information including account numbers, credit limits, account balances and the like. The account management circuit 130 is structured to maintain the account database 120. In some arrangements, the account management circuit 130 facilitates access to the account database 120 for the verification circuit 126, or other circuits of the card management computing system 106.

The card management computing system 106 also includes a geolocation circuit 132 and a location database 122. The location database 122 stores location information relating to the user computing device 104. The location information may include information relating to a location of the user computing device 104 such as location (e.g., a specific address), date, time, and the like. The geolocation circuit 132 is structured to maintain the location database 122. The geolocation circuit 132 may be structured to initiate geolocation monitoring for a set amount of time to populate the location database 122. In some arrangements, the geolocation circuit 132 facilitates access to the location database 122 for the verification circuit 126, or other circuits of the card management computing system 106.

The card management computing system 106 also includes a card management circuit 124. The card management circuit 124 monitors one or more cards associated with an account associated with the user 102 to determine when a card associated with the account will expire, when a card associated with the account is active, when a card associated with the account is not active, when a card associated with the account is reported as lost or stolen and the like. The card management circuit 124 may also determine a card type has changed (e.g., an account is closed when multiple accounts are linked to a single card) and may therefore identify the card as needing to be replaced. The card management circuit 124 may also manage credit limits, account balances, transactions, and the like for cards associated with the account.

The card management computing system 106 also includes a verification circuit 126. The verification circuit 126 verifies and/or determines an address associated with the user 102 before sending a replacement card and/or a new card to an address associated with the account of the user 102 stored in the account database 120. The verification circuit 126 compares the address stored in the account database 120 with the geolocation information stored in the location database 122 to confirm the address in the account database 120 is a current address for the user 102. The verification circuit 126 may have rules for when the address in the account database 120 does not match the address in the location database 122. The verification circuit 126 may also have rules such that when multiple addresses are stored in the location database 122, the rules will determine a most frequent address to compare to the address stored in the account database 120.

The card management computing system 106 also includes an alert circuit 128. The alert circuit 128 may send an alert to the user 102 via the user computing device 104 (e.g., the card management interface circuit 110) when the address stored in the account database 120 does not match the most frequent address in the location database 122. The alert circuit 128 also manages responses to an alert from the user computing device 104.

Figure 2:
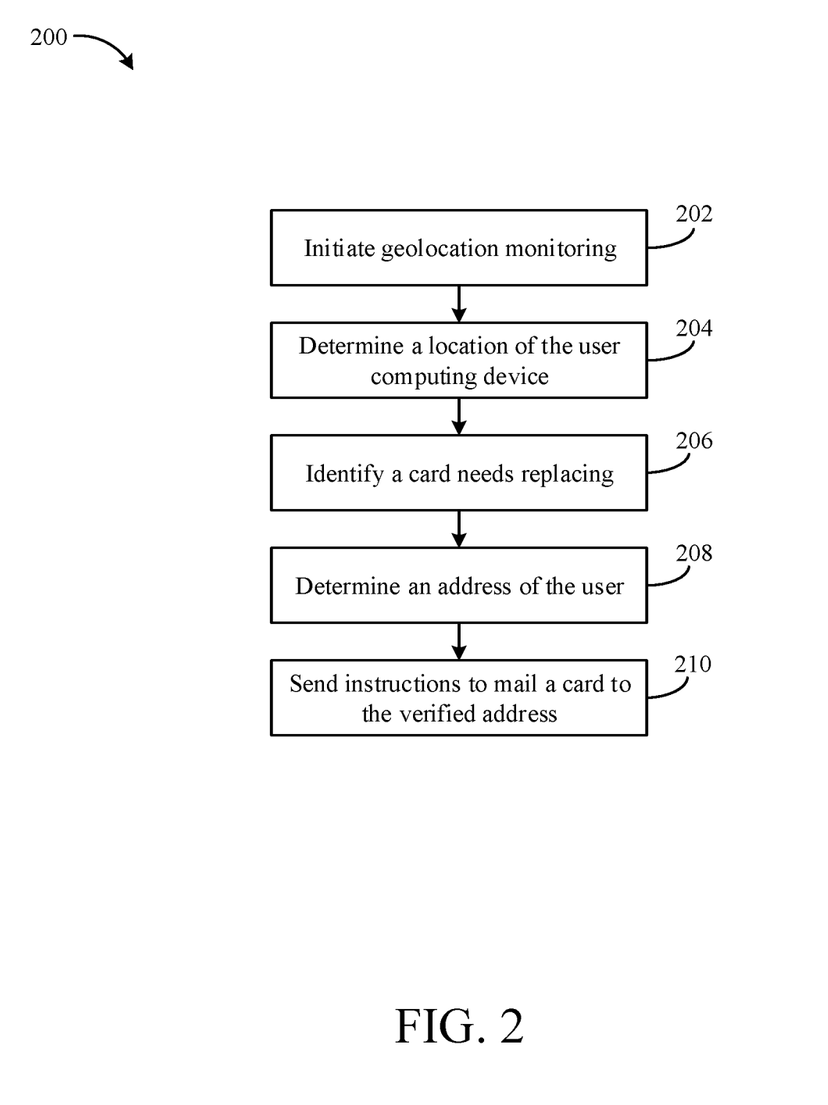
FIG. 2 is a flow diagram of a method of verifying an address for a user prior to sending a replacement card, according to an example embodiment.

Referring to FIG. 2, a flow diagram of a method 200 of verifying an address for a user prior to sending a replacement card is shown according to an example embodiment. The method 200 is performed by the card management computing system 106.

The method 200 begins by initiating geolocation monitoring at 202. The geolocation circuit 132 initiates geolocation monitoring of the location detection circuit 134 of the user computing device 104. The location detection circuit 134 may be continuously monitoring but may send location information to the geolocation circuit 132 via the network interface circuit 112 or the card management interface circuit 110 when geolocation monitoring is initiated. In some embodiments, the geolocation circuit 132 instructs the location detection circuit 134 to initiate geolocation monitoring (e.g., by sending a location request from the card management computing system 106 to the user computing device 104). The geolocation address verification may be initiated a set number of days prior to a card being identified as needing to be replaced. For example, geolocation address verification may be initiated 30 days before a card is identified as needing to be replaced. In some embodiments, the user 102 may identify that a card is lost or stolen and the geolocation address verification may be initiated to provide location information in a shorter time period, as further described below. By initiating geolocation address verification, the location of the user computing device 104 is tracked and stored in the location database 122.

The geolocation circuit 132 determines the location of the user computing device 104 via the location detection circuit 134 at 204. In some embodiments, the geolocation circuit 132 uses a single location ping of the user computing device 104. The location of the user computing device 104 may be continuously monitored for a set period of time to determine the location of the user computing device 104. Alternatively, the user computing device 104 may be monitored for specified time periods (e.g., time of day) during a set length of time (e.g., a month) to determine the location of the user computing device 104. In some embodiments, the location of the user computing device 104 may only be monitored during specified hours (e.g., 9 PM to 7 AM (at night)) during the set period of time to determine the location of the user computing device 104. In another embodiment, the location of the user computing device 104 may be determined during specified days (e.g., Monday through Friday) during the set period of time. The user 102 may be able to set geolocation determination preferences to be associated with the account held by the user 102. For example, if the user 102 works night shifts, the user 102 may set a preference for determining the location of the user computing device 104 during different hours than a preference set for a user who works a regular 9-5 shift. The user 102 may be able to set specific criteria for the days and times the location of the user computing device 104 is determined. Alternately, the user 102 may select a set of predefined configurations of days and times for geolocation determination. In another embodiment, when the user 102 is using the card management interface circuit 110 to request a replacement card, the user 102 may receive a notification (e.g., email, text, push notification, etc.) asking if the user 102 is currently at home to determine the location of the user computing device 104. In some embodiments, when the user 102 calls an agent from the card management entity 108, the agent may ask the user 102 if the user 102 is using the user computing device 104 associated with the card management interface circuit 110 and if the user 102 is currently at home. If so, the location detection circuit 134 can provide location information to verify the address of the user computing device 104.

The card management circuit 124 identifies a card associated with the account associated with the user 102 that needs replacing at 206. The card management circuit 124 may identify that the card associated with the account of the user 102 will be expiring in a certain amount of days (e.g., 60 days) and therefore the card may be identified as needing to be replaced. The card may be identified as needing to be replaced prior to the expiration of the card so that a new or replacement card may be mailed to the user 102 and received by the user 102 prior to the expiration of a current card. Alternatively, a card may be deemed as lost or stolen by the user 102 and may therefore be identified as needing to be replaced. The card management circuit 124 may also determine a card type has changed (e.g., an account is closed when multiple accounts are linked to a single card) and may therefore identify the card as needing to be replaced.

The verification circuit 126 determines an address of the user 102 at 208. The address of the user 102 may be verified by comparing the location information stored in the location database 122 and collected using the location detection circuit 134 to the address stored in the user account database 120. The verification circuit 126 uses the location data of 204 to determine an address of the user computing device 104. In some embodiments, the location detection circuit 134 is about to obtain precise location data that can be associated with an address. In some embodiments, the location detection circuit 134 may provide less precise location data. To accommodate, the location detection circuit 134, the location database 122, verification circuit 126 or other circuit may use other methods to obtain more precise address information. In some embodiments, the more precise address is determined by comparing the less precise location information (e.g., a city block, etc.) to an address associated with the user account. If the address associated with the user account falls within the less precise location data, the verification circuit 126 may determine that the address the replacement card would be sent is the address currently associated with the user account. If the address associated with the user account is not located in the less precise location data, but is within a predetermined threshold (e.g., a quarter mile) of the address associated with the user account associated with the user computing device 104, the verification circuit 126 may determine the replacement card should be sent to the address associated with the user account associated with the user computing device 104. In some embodiments, when the location data is less precise, the location detection circuit 134 determines an address of the user computing device 104 by using a Wi-Fi connection, or available Wi-Fi connections that the user computing device 104 is identifying. For example, the location detection circuit 134 may use the user's setting (e.g., home, work, public, etc.) for a Wi-Fi network on the user computing device 104 to determine a location and address of the user computing device 104. In some embodiments, the location detection circuit 134 may know a Wi-Fi SSID of the user's home Wi-Fi network to determine a home address of the user 102. In some embodiments, the location detection circuit 134 may use multiple location data points from different monitoring times (e.g., one per hour, for 5 hours, one per day for 5 days, multiple per hour, multiple per day, etc.) and overlay the location data points to determine a more precise location to determine an address. Alternatively, the location detection circuit 134 may "average" (e.g., triangulate, etc.) location data points to determine a more precise location to determine an address of the user computing device 104. While the location detection circuit is described above with respect to determining an address of the user computing device 104, the verification circuit 134, location database 122 or other circuits may be used alone or in combination with the location detection circuit 136 to determine an address using the location data collected via the location detection circuit 136. Another method of determining an address of the user 102 will be described in greater detail with respect to FIG. 3.

The account management circuit 130 sends instructions to mail a new or replacement card to the verified address at 210. The instructions may be sent to a third party entity that manufactures and mail the new card. Alternatively, the instructions may be sent to the account database 120 to be stored until the new card is created and/or ready to be mailed. The new card is mailed to the verified address, reducing the number of cards that get mailed to out of date addresses and are subsequently returned to the sender.

Figure 3:
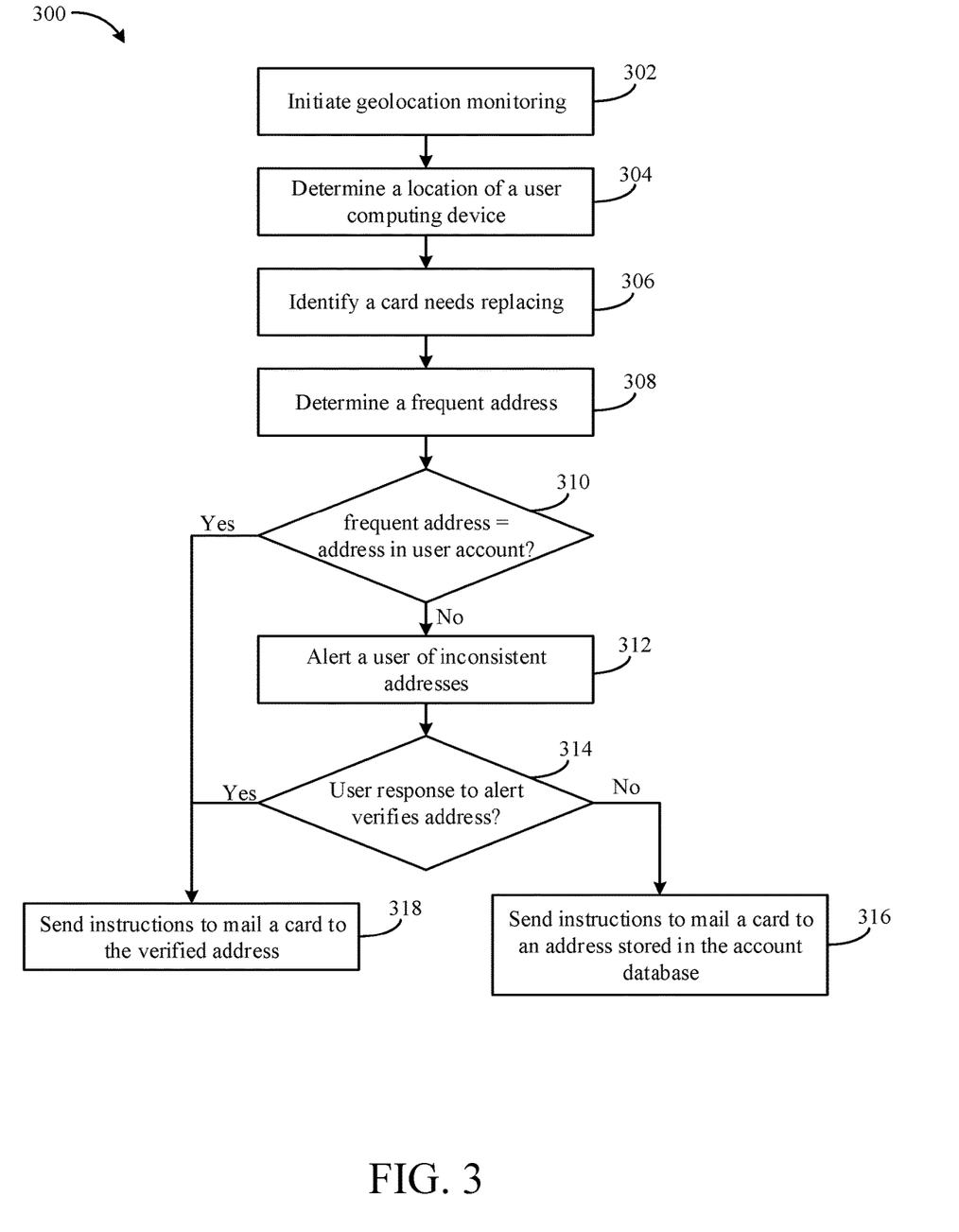
FIG. 3 is a flow diagram of a method of verifying an address for a user prior to sending a replacement card, according to an example embodiment.

Referring to FIG. 3, a flow diagram of a method 300 of verifying an address for a user prior to sending a replacement card is shown according to an example embodiment. The method 300 is performed by the card management computing system 106.

The method 300 begins by initiating geolocation address verification at 302, monitoring the location of the user computing device 104 for a set time period at 304 and identifying a card needs replacing at 306. Processes 302, 304 and 306 may be substantially similar to processes 202, 204 and 206 of method 200, respectively.

The verification circuit 126 determines an address for the user computing device 104 at 308 using the location information stored in the location database 122 and collected using the location detection circuit 134. The frequent address may be an address where the user computing device 104 spent a highest number of hours during the set length of time. For example, if the user computing device 104 spent 250 out of 300 hours during the set length of time for geolocation monitoring at location A, and the other 50 hours were spent at a combination of locations B, C and D, location A would be determined as the frequent address of the user computing device 104. The frequent address may be an address where the user computing device 104 spent the most amount of days during the set time period. For example, if the user computing device 104 was at location A for 25 of the days, location B for 10 of the days and location C for 5 days out of the 30 days that the location of the user computing device 104 was monitored, location A would be determined to be the frequent address of the user computing device 104. Alternative methods of determining the frequent address of the user computing device 104 are intended to fall within the scope and spirit of the present disclosure.

The verification circuit 126 may have rules set up for determining the frequent address of the user computing device 104. For example, the verification circuit 126 may have a rule such that if two or more addresses are above a set threshold (e.g., for a set time period of 30 days, the location of the user computing device 104 was at two or more addresses more than 20 days each), a certain action may occur. As another example, the verification circuit 126 may have a rule such that if the address with the highest frequency is within a predetermined variation from an address with the second highest frequency (e.g., for a set time period of 30 days, the user computing device 104 was at location A for 25 days and at location B for 20 days, and the predetermined variation is 5 days), a certain action may occur. As another example, the verification circuit 126 may have multiple rules set up for determining the frequent address of the user computing device 104. The user 102 may be able to select or create rules for determining the frequent address for the user computing device 104. For example, the user 102 may choose to always use the address with the highest number of days or hours as the most frequent address. Alternatively, the user 102 may choose to be notified when multiple addresses have frequencies within a set variation of one another. The actions that may occur include notifying the user 102 via the user computing device 104, selecting the frequent address of the two or more addresses that matches the address stored in the account database 120, always selecting the address with the highest frequency, and the like.

The verification circuit 126 compares the frequent address determined at 308 to the address stored in the account database 120 at 310. If the frequent address matches the address stored in the account database 120, the account management circuit 130 sends instructions to mail the new card to the verified address at 318. If the frequent address determined at 308 does not match the address stored in the account database 120, an alert gets sent to the user computing device 104 at 312.

The alert circuit 128 sends an alert to the user 102 via the user computing device 104 at 312. The alert may be sent in the form of a text message, push notification, email or the like. The user 102 may define alert preferences in the account database 120. The alert may include an indication to the user 102 that the most frequent address of the user computing device 104 in the set time period does not match the address associated with the user 102 in the account database 120. The alert may provide the user 102 with the frequent address determined at 308. The alert may ask the user 102 to confirm or select the frequent address is the address where a new/replacement card should be sent. The alert may provide the user 102 with a list of frequent addresses (e.g., if two or more addresses were determined to be frequent and no rules were in place for selecting a single address) and ask the user to select an address. The alert may allow the user 102 to select the address associated with the user 102 in the account database 120 as the address where the new/replacement card should be sent. The alert may also provide the user 102 with the opportunity to provide a different address where the new/replacement card should be sent instead of the frequent address or the address associated with the user 102 in the account database 120. The alert may ask the user if the selected address, or new address provided, should be stored in the account database 120 as a current address for user 102. The alert may set a specified amount of time in which the user 102 has to reply to the alert.

The alert circuit 128 may receive a response to the alert from user 102 via the card management interface circuit 110 or the user computing device 104 at 314. The user 102 may use a variety of input devices to respond to the alert. If the response verifies or selects an address where the new/replacement card should be sent, the account management circuit 130 sends instructions to mail the new card to the verified address at 318. If the response does not verify an address where the new/replacement card should be sent, or the user 102 does not respond to the alert in the specified amount of time, the account management circuit 130 sends instructions to mail the new card to the address associated with the user 102 in the account database 120 at 316.

The account management circuit 130 sends instructions to mail a new or replacement card to the address stored in the account database 120 at 316. The instructions may be sent to a third party entity that manufactures and mails the new or replacement card. Alternatively, the instructions may be sent to the account database 120 to be stored until the card is created and/or ready to be mail. The card may be mailed to the determined address by a designated entity.

The account management circuit 130 sends instructions to mail a new or replacement card to the verified address at 318. The instructions may be sent to a third party entity that manufactures and mails the new or replacement card. Alternatively, the instructions may be sent to the account database 120 to be stored until the card is created and/or ready to be mailed. The card may be mailed to the verified address, reducing the number of cards that get mailed to out of date addresses and are therefore returned to the sender. The account database 120 may also be updated to reflect the address verified by the user 102 at 314.

By verifying or determining an address of the user prior to sending a new or replacement card, entities save time and money by reducing the number of cards that get returned to the entity because the card was mailed to an inaccurate address. In addition, users do not necessarily need to constantly update an address associated with an account every time the address for the user changes. The individual may also be traveling for an extended period of time, and may be able to receive the new/replacement card at an address that is not a primary residency for the user.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
   storing, by a card management computing system in an account database, a first address of a user, the first address being an address stored in an account database;
   determining, by the card management computing system, one or more addresses of the user by performing geolocation monitoring of a mobile device of the user, the one or more addresses being stored in a location database;
   determining, by the card management computing system, whether the first address and a second address are inconsistent with each other, the second address being an address from the one or more addresses stored in the location database;
   in response to determining by the card management computing system that the first address and the second address are inconsistent with each other, transmitting, by the card management computing system, an alert, the alert including an indication to the user that the first address and the second address are inconsistent;
   receiving user response based on the alert selecting one of the first address and the second address; and
   sending instructions to mail a card to the selected one of the first address and the second address.

2. The method of claim 1, wherein
   the first address is an address for an account of the user;
   performing the geolocation monitoring of the mobile device of the user comprises determining an address frequented by the mobile device; and
   the address frequented by the mobile device is the second address.

3. The method of claim 1, wherein performing the geolocation monitoring of the mobile device comprises determining a location of the mobile device during a predetermined time period.

4. The method of claim 3, further comprising terminating the geolocation monitoring after a predetermined amount of time.

5. The method of claim 1, further comprising determining, by the card management computing system, that a previous card of the user needs to be replaced, wherein the card management computing system determines the second address upon determining that the previous card needs to be replaced.

6. The method of claim 1, further comprising in response to determining that the first address and the second address are not inconsistent with each other, sending instructions to mail the card to the first address.

7. The method of claim 6, wherein the first address and the second address are determined to be not inconsistent with each other in response to determining that the second address is within a threshold distance from the first address.

8. A non-transitory computer-readable medium comprising computer-readable instructions such that, when executed by a processor of a card management computing system, causes the processor to:
  store, in an account database, a first address of a user;
  determine one or more addresses of the user by performing geolocation monitoring of a mobile device of the user, the one or more addresses being stored in a location database;
  determine whether the first address and a second address are inconsistent with each other the second address being an address from the one or more addresses stored in the location database;
  in response to determining that the first address and the second address are inconsistent with each other, transmit an alert, the alert including an indication to the user that the first address and the second address are inconsistent, receive user response based on the alert selecting one of the first address and the second address; and
  send instructions to mail a card to the selected one of the first address and the second address.

9. The non-transitory computer-readable medium of claim 8, wherein
  the first address is an address for an account of the user;
  performing the geolocation monitoring of the mobile device of the user comprises determining an address frequented by the mobile device; and
  the address frequented by the mobile device is the second address.

10. The non-transitory computer-readable medium of claim 8, wherein performing the geolocation monitoring of the mobile device comprises determining a location of the mobile device during a predetermined time period.

11. The non-transitory computer-readable medium of claim 10, wherein the processor is further structured to terminate the geolocation monitoring after a predetermined amount of time.

12. The non-transitory computer-readable medium of claim 8, wherein the processor is further structured to determine that a previous card of the user needs to be replaced, wherein the second address is determined upon determining that the previous card needs to be replaced.

13. The non-transitory computer-readable medium of claim 8, wherein the processor is further structured to, send instructions to mail the card to the first address in response to determining that the first address and the second address are not inconsistent with each other.

14. The non-transitory computer-readable medium of claim 13, wherein the first address and the second address are determined to be not inconsistent with each other in response to determining that the second address is within a threshold distance from the first address.

15. An address verification system, comprising:
  a network interface circuit structured to communicate data to and from devices via a network;
  memory; and
  one or more processors structured to:
    store, in an account database, a first address of a user;
    determine one or more addresses of the user by performing geolocation monitoring of a mobile device of the user, the one or more addresses being stored in a location database;
    determine whether the first address and a second address are inconsistent with each other, the second address being an address from the one or more addresses stored in the location database;
    in response to determining that the first address and the second address are inconsistent with each other, transmit an alert, the alert including an indication to the user that the first address and the second address are inconsistent, receive user response based on the alert selecting one of the first address and the second address; and
    send instructions to mail a card to the selected one of the first address and the second address.

16. The address verification system of claim 15, wherein
  the first address is an address for an account of the user;
  performing the geolocation monitoring of the mobile device of the user comprises determining an address frequented by the mobile device; and
  the address frequented by the mobile device is the second address.

17. The address verification system of claim 15, wherein performing the geolocation monitoring of the mobile device comprises determining a location of the mobile device during a predetermined time period.

18. The address verification system of claim 15, wherein the process is further structured to determine that a previous card of the user needs to be replaced, wherein the second address is determined upon determining that the previous card needs to be replaced.

19. The address verification system of claim 15, wherein the processor is further structured to send instructions to mail the card to the first address in response to determining that the first address and the second address are not inconsistent with each other.

20. The address verification system of claim 19, wherein the first address and the second address are determined to be not inconsistent with each other in response to determining that the second address is within a threshold distance from the first address.

* * * * *